Figure 1:
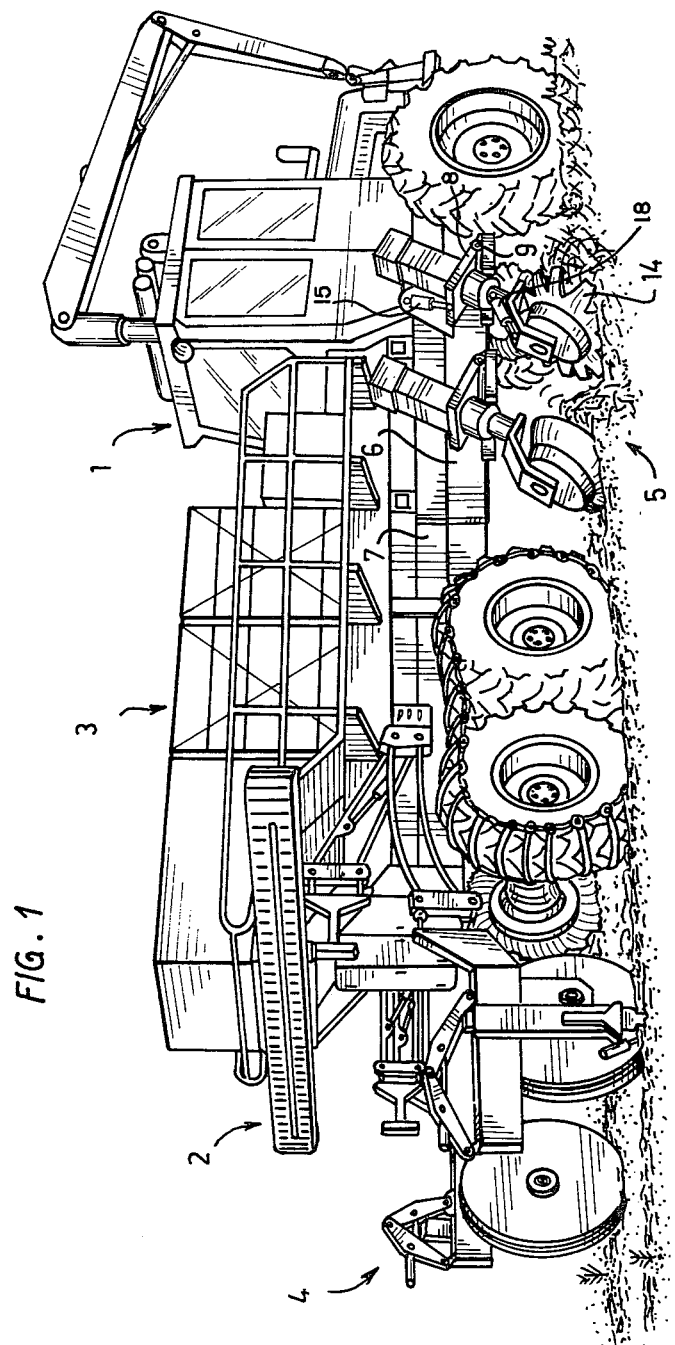

United States Patent [19]

Lahti

[11] 4,353,421

[45] Oct. 12, 1982

[54] SOIL PREPARING DEVICE FOR PREPARING FOREST SOIL

[75] Inventor: Lasse Lahti, Mänttä, Finland

[73] Assignee: G. A. Serlachius Oy, Mantta, Finland

[21] Appl. No.: 112,615

[22] Filed: Jan. 16, 1980

[30] Foreign Application Priority Data

Jan. 18, 1979 [FI] Finland .................................. 790162

[51] Int. Cl.³ ........................ A01B 33/00; A01B 61/00
[52] U.S. Cl. ........................................ 172/5; 172/117;
172/124; 172/260.5; 172/38
[58] Field of Search ................... 172/12, 5, 6, 38, 117,
172/124, 264, 265, 261, 463, 464, 465, 260.5, 4,
551

[56] References Cited

U.S. PATENT DOCUMENTS

| 3,032,122 | 5/1962 | Geurts | 172/264 |
|---|---|---|---|
| 3,369,612 | 2/1968 | Laikam | 172/5 |
| 3,430,702 | 3/1969 | Hamby | 172/44 |
| 3,513,916 | 5/1970 | Hyler | 172/465 |
| 3,857,447 | 12/1974 | Adams | 172/777 |
| 4,064,946 | 12/1977 | Ernst | 172/264 |

FOREIGN PATENT DOCUMENTS

| 1120645 | 4/1956 | France | 172/465 |
|---|---|---|---|
| 2310074 | 12/1976 | France | 172/265 |
| 498923 | 4/1976 | U.S.S.R. | 172/265 |
| 599756 | 3/1978 | U.S.S.R. | 172/12 |
| 622427 | 9/1978 | U.S.S.R. | 172/123 |

*Primary Examiner*—Richard J. Johnson
*Attorney, Agent, or Firm*—Cushman, Darby & Cushman

[57] ABSTRACT

A soil preparing device for preparing forest soil to a planting bed. The device comprises a frame intended to be mounted on a forest tractor, a support arm mounted on the frame pivotally around a horizontal link, and a preparing element supported by a slide mounted vertically movably on said support arm. The slide is fastened to a hydraulic cylinder supported by said support arm for continuously adjusting the vertical position of said slide and, accordingly, of the position of the preparing element with respect to the ground during the preparation. A deviation of the support arm upwardly or downwardly from a neutral position activates said hydraulic cylinder of the slide to displace the preparing element upward and downward, respectively, due to variations in the ground level and obstacles on the ground. The preparing element can therefore be displaced clear of any unevennesses in the ground without substantially deviating from its working angle in relation to the ground.

5 Claims, 4 Drawing Figures

SOIL PREPARING DEVICE FOR PREPARING FOREST SOIL

This invention relates to a soil preparing device for preparing forest soil to a planting bed, said device comprising a frame, at least one support arm mounted on said frame pivotally around a horizontal link, a slide mounted on said support arm vertically adjustably in relation to said arm and a preparing element fastened to said slide.

The preparing elements of a soil preparing device usually comprise disk-shaped plows or cutters which operate either singly or in pairs and which are either freely rotating or rotated by power means. The front element in a pair of preparing elements serves the purpose of removing broken twigs and the like, and the rear one serves the purpose of preparing the mineral soil.

A soil preparing device of this type is usually utilized in conjunction with forest planting for preparing forest soil to a planting bed suitable primarily for mechanical planting. The preparing element should, without changing its working angle, as closely as possible follow the variations in the ground level in order to produce a uniform preparation but the preparing element should still be able to avoid stumps, stones and other stationary obstacles when advancing the soil preparing device, e.g., by means of a forest tractor.

In previously known soil preparing devices, the preparing element is mounted on the rear end of a support arm which at its front end is mounted on the frame of the preparing device by means of a horizontal pivot. The support arm is in this case so long that its pivotal movement around the horizontal pivot produces in the rear end of the support arm the required vertical movement of the preparing element for following the ground level and for avoiding obstacles. A disadvantage in such a soil preparing device is its great length which is due to the required long support arm. In addition, the working angle of the preparing element in relation to the ground varies considerably due to the pivotal movement of the support arm around the horizontal pivot. Because of this, the prepared furrow will be uneven.

Also soil preparing devices are previously known in which the preparing element is mounted on the support arm rotatably around a vertical axis so that a spiked disk acting as preparing element will turn around the vertical axis to a position parallel with the advancing movement and roll over an obstacle like the wheels of a vehicle. However, the pivotal movement of the preparing disk around the vertical axis produces a furrow deviating from a straight line which makes mechanical planting difficult.

In cultivators it is previously known to fasten preparing elements vertically adjustably on the support arms. The adjustment is carried out manually at the beginning of the preparation, and for the duration of the preparation the preparing elements are fastened undisplaceably on a fixed level with respect to said support arms by means of clamp bolts. The purpose of the adjustment is only to set the working depth for the preparing elements, and the construction fails to improve the ability of the preparing elements to avoid obstacles on the ground.

It is an object of this invention to provide a soil preparing device which eliminates the above-mentioned disadvantages, while making possible a more satisfactory prepared furrow in the direction of movement by means of a preparing element which is shorter in the direction of movement of the soil preparing device. This object is achieved by means of a preparing device according to the invention which is characterized in that said slide is fastened to a displacing means, such as a hydraulic cylinder, supported by said support arm for vertical adjustment of said preparing element during the preparation.

The invention is based on the idea that the preparing element can during the preparation perform a vertical movement in relation to the support arm, whereby the pivotal movement of the support arm around the horizontal link mainly only senses the variations in the ground level and guides the vertical movement of the preparing element downward toward the ground or upward from the ground, respectively. Thus, the preparing element follows the variations of the ground without considerably deviating from the predetermined vertical and lateral working angle and is able to pass over obstacles substantially without changing said angle. The result is a nearly continuous and straight prepared furrow which is a prerequisite, for example, for a planting machine. Due to the vertical adjusting movement of the preparing element, the support arm can be made short so that the entire preparing device will be compact in the direction of movement.

Figure 2:
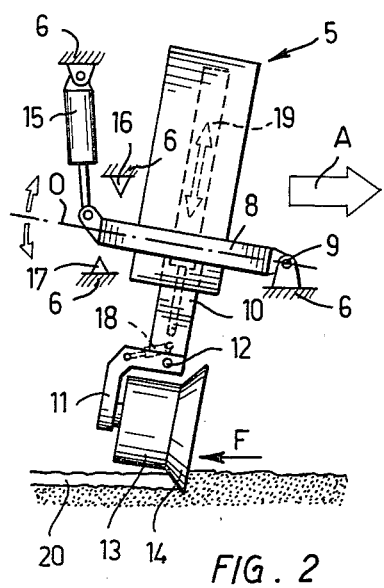
Figure 3:
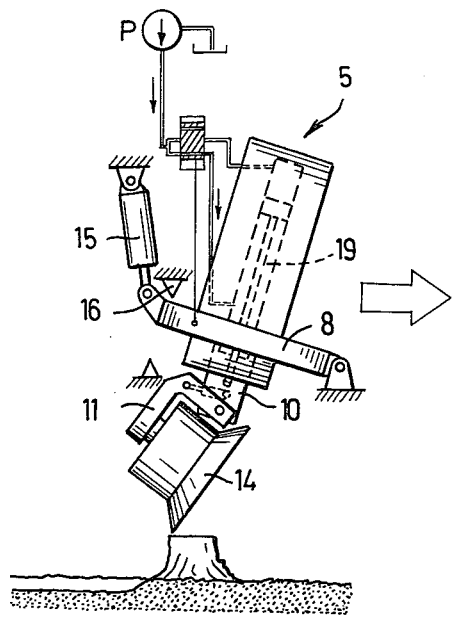
Figure 4:
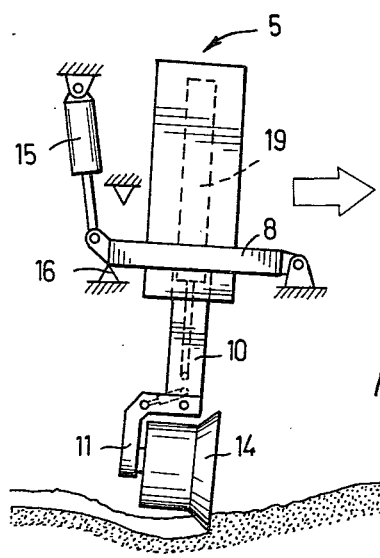

The invention will now be described in more detail with reference to the accompanying drawings in which:

FIG. 1 is a perspective side and rear view of a forest planting tractor provided with a soil preparing device according to the invention, and FIGS. 2 to 4 are side views on an enlarged scale of one preferred embodiment of the preparing device in neutral position and in upper and lower positions, respectively.

The forest planting machine shown in FIG. 1 of the drawings comprises a forest tractor, a plant feeding device 2 and a transportation container 3 for plants mounted on the tractor, a planting device 4 mounted behind the tractor and a soil preparing device 5 mounted laterally of the tractor.

Because the tractor, the feeding device and the planting device may by of any type known per se, their construction and operations shall not be described in more detail in this connection.

The preparing device 5 includes a frame 6 fastened to the chassis 7 of the tractor. On the frame are mounted two preparing units located at a distance from each other, each of said units comprising a support arm 8 which at its front end is pivotally journalled on a horizontal pivot 9 fastened to the frame so that said support arm pivots in a vertical plane around a horizontal axis extending transversely to the direction of movement A of the tractor. On the support arm is slideably mounted a substantially vertical slide 10 the lower end of which supports a bracket 11 pivotable around a horizontal pivot 12 which is supported by the slide and is located transversely to the direction of movement of the tractor. The bracket supports a hydraulic motor 13 which rotates a toothed disk 14 acting as a preparing element. The axis of rotation of the disk is substantially at right angles to the direction of displacement of the slide and the front face of the disk is directed towards the direction of movement of the tractor.

The support arm 8 is at its rear end connected to a damping cylinder 15 supported by said frame 6. The pivotal movement of the support arm is upwardly limited by a stop 16 fastened to said frame and downwardly by a stop 17 similarly fastened to said frame. A damping cylinder 18 is mounted between the bracket 11 supporting the disk and the slide 10. The cylinders 15 and 18 are connected to a pressure accumulator so that they act as dampeners against impacts.

The slide 10 is connected to an adjusting cylinder 19 which is supported by the support arm 8 and which adjusts the vertical position of the disk in relation to the support arm. The adjusting cylinder is connected to a pressure source and its operation as a pushing or pulling element is controlled depending on the pivotal movement of the support arm by means of a suitable valve. When the support arm is located in the neutral position 0, FIG. 2, i.e. in the middle of the stops 16 and 17, the adjusting cylinder 19 should remain stationary. For this purpose the hydraulic cylinder 19 is connected to a pressure source through an adjusting valve which in said neutral position of the support arm is closed and, as the support arms turns upward toward the upper stop 16, opens the connection from the pressure source to the underside of the piston of the hydraulic cylinder 19 and, as the support arm turns downward toward the lower stop 17, opens the connection from the pressure source to the upper side of the piston of the hydraulic cylinder.

The damping cylinder 15 and gravity tend to pivot the support arm downward toward the lower stop 17. The adjusting cylinder 19 is automatically activated by the pivotal movement to displace the slide downward, so that said slide starts to push the disk downward. When the preparing disk has touched the ground and has pentrated deep enough into the ground, a counter-force F is produced as the preparing unit is pulled foward, said force tending to pivot the support arm upward toward the upper stop 16. If the counter-force becomes so great that the support arm is pivoted upward and exceeds the neutral position, the adjusting cylinder 19 starts to pull the slide upward whereby the force F becomes weaker and the support arm again pivots toward the neutral position. The vertical position of the preparing disk will in this way be automatically adjusted according to the variations in the ground level.

When the preparing disk meets a stone or a stump, the support arm will first pivot upward toward the upper stop 16, due to which the adjusting cylinder 19 pulls the slide and the disk to the upper position whereafter the damping cylinder 18 permits the bracket 11 and the disk to turn to a retracted position in relation to the slide.

It will be noted that the disk follows the variations in the ground substantially without changing its vertical and lateral angular working position, with the exception of the angular displacement taking place at an obstacle, and that the disk immediately after the obstacle is directly lowered to said angular working position. The planting furrow 20 is very even.

The drawings and the specification relating thereto are only intended to illustrate the idea of the invention. In its details, the soil preparing device according to the invention may vary considerably within scope of the claims. Instead of the slide 10, the bracket 11 can be mounted vertically movably, e.g., by means of an articulated quadrangle. Instead of damping cylinders, also springs may be used. In addition to a preparing element of the disk plow and disk cutter type, the invention can also be applied to preparing elements of the cultivator type.

What I claim is:

1. A soil preparing device for preparing forest soil to a planting bed, said device comprising a soil-engageable preparing element, a frame, at least one support arm mounted on said frame for pivotal movement around a horizontal pivot as the preparing element moves along the ground during a preparing operation; a slide supporting the preparing element and mounted on said support arm for vertical adjustment in relation to said arm, characterized in that said slide is fastened to a displacing means supported by said support arm, for rectilinear vertical adjustment of said preparing element with respect to said support arm in a direction perpendicular to said arm during the soil preparation, said displacing means being arranged to push said slide downward and to pull the slide upward, respectively, as said support arm pivots downward and upward, respectively, as a result of forces applied to said preparing element by an obstacle in the ground as the device is moved along the ground.

2. A soil preparing device as claimed in claim 1, wherein the support arm is fastened to a damping means supported by the frame, said damping means urging the support arm to a neutral position from which it can pivot downward and upward.

3. A soil preparing device as claimed in claim 1 or 2, characterized in that said preparing element is fastened to said slide (11) by means of a bracket (11) pivotable around a horizontal pivot in relation to the slide.

4. A soil prpeparing device as claimed in claim 3, characterized in that between said slide (11) and said bracket (11) is arranged a damping means permitting said bracket to pivot in a vertical plane in relation to the slide when said support arm has pivoted to an upper limit position.

5. A soil preparing device as in claim 1 or 2 wherein said displacing means includes a hydraulic cylinder.

* * * * *